United States Patent
Shin et al.

(10) Patent No.: US 12,341,943 B2
(45) Date of Patent: Jun. 24, 2025

(54) APPARATUS AND METHOD FOR ELIMINATING DUPLICATE DATA BETWEEN MULTI-VIEW VIDEOS

(71) Applicant: Electronics and Telecommunications Research Institute, Daejeon (KR)

(72) Inventors: Hong-Chang Shin, Daejeon (KR); Gwang-Soon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 145 days.

(21) Appl. No.: 17/961,945

(22) Filed: Oct. 7, 2022

(65) Prior Publication Data

US 2023/0114021 A1    Apr. 13, 2023

(30) Foreign Application Priority Data

Oct. 8, 2021   (KR) .......................... 10-2021-0134332
Jul. 5, 2022   (KR) .......................... 10-2022-0082630

(51) Int. Cl.
   *H04N 13/15*    (2018.01)
   *G06T 7/11*     (2017.01)
   (Continued)

(52) U.S. Cl.
   CPC ............... *H04N 13/15* (2018.05); *G06T 7/11* (2017.01); *G06T 7/90* (2017.01); *G06V 10/44* (2022.01);
   (Continued)

(58) Field of Classification Search
   None
   See application file for complete search history.

(56) References Cited

U.S. PATENT DOCUMENTS 11,037,362 B2 *   6/2021   Shin .................... G06T 7/194
11,350,074 B2 *   5/2022   Shin .................... H04N 13/156
(Continued)

FOREIGN PATENT DOCUMENTS

KR   1020200112737 A   10/2020
KR   1020200143287 A   12/2020
KR   1020210158784 A   12/2021

OTHER PUBLICATIONS

Milovanovic et al., "Learn how to Prune Pixels for Multi-view Neural Image-based Synthesis," 2023 IEEE Int'l. Conf. on Multimedia and Expo Workshops (ICMEW), Jul. 1, 2023, pp. 158-163. (Year: 2023).*

(Continued)

*Primary Examiner* — Reza Aghevli
(74) *Attorney, Agent, or Firm* — WILLIAM PARK & ASSOCIATES LTD.

(57) ABSTRACT

Disclosed herein are an apparatus and method for removing redundant data between multi-view videos. The method includes generating a pruning mask of an additional view image by mapping a basic view image to the additional view image, among multi-view images, and revalidating the pruning mask using color information of the basic view image and the additional view image. Revalidating the pruning mask may include defining a color relationship between the basic view image and the additional view image by extracting predetermined sample values from corresponding pixels between the basic view image and the additional view image, which are included in the pruning candidate group of the pruning mask, and detecting pixels that do not match the defined color relationship, among the pixels in the pruning mask, as outliers.

14 Claims, 6 Drawing Sheets

(51) Int. Cl.
*G06T 7/90* (2017.01)
*G06V 10/44* (2022.01)
*G06V 10/56* (2022.01)
*G06V 10/75* (2022.01)

(52) U.S. Cl.
CPC ............ *G06V 10/56* (2022.01); *G06V 10/751* (2022.01); *G06T 2207/10024* (2013.01)

(56) References Cited

U.S. PATENT DOCUMENTS

| | | | | |
|---|---|---|---|---|
| 11,558,625 | B2* | 1/2023 | Shin | G06F 16/738 |
| 2012/0288015 | A1* | 11/2012 | Zhang | H04N 19/152 |
| | | | | 375/240.26 |
| 2020/0413094 | A1 | 12/2020 | Lee et al. | |
| 2021/0006764 | A1* | 1/2021 | Shin | H04N 13/111 |
| 2021/0006834 | A1* | 1/2021 | Salahieh | H04N 19/597 |
| 2021/0409726 | A1* | 12/2021 | Shin | H04N 19/186 |
| 2023/0114021 | A1* | 4/2023 | Shin | G06V 10/44 |
| | | | | 348/43 |

OTHER PUBLICATIONS

Basel Salahieh et al., Test Model 10 for MPEG Immersive Video, WG 4, MPEG Video Coding, Jul. 2021, pp. 4-54, International Organisation for Standardisation Organisation Internationale De Normalisation ISO/IEC JTC 1/SC 29/WG 4, MPEG Video Coding.
Hong-Chang Shin et al., [CE2.9-related] Simplification of second-pass pruner by applying uniform-sampling based selection., ISO/IEC JTC1/SC29/WG04 MPEG/M57356, Jul. 2021, International Organisation for Standardisation Organisation Internationale De Normalisation ISO/IEC JTC1/SC29/WG04 MPEG Video Coding, pp. 1-3, Republic of Korea.

* cited by examiner

APPARATUS AND METHOD FOR ELIMINATING DUPLICATE DATA BETWEEN MULTI-VIEW VIDEOS

CROSS REFERENCE TO RELATED APPLICATIONS

This application claims priority under 35 U.S.C. §119(a) to Korean Patent Application No. 10-2021-0134332, filed Oct. 8, 2021, and No. 10-2022-0082630, filed Jul. 5, 2022, in the Korean Intellectual Property Office, which are hereby incorporated by reference in their entireties into this application.

BACKGROUND OF THE INVENTION

1. Technical Field

The disclosed embodiment relates to an image synthesis technique that uses residual images, from which overlapping areas between reference views are removed, for respective views when an immersive media service is provided using multiple reference view images, thereby supporting omni-directional 6 DoF while efficiently managing image data.

2. Description of the Related Art

These days, in order to provide an immersive video service, standardization of a pruning technique, which is configured to detect overlapping areas between multiple view images and remove the same in order to efficiently manage data when an arbitrary virtual view is synthesized using multi-view videos, and of metadata, which is required for rendering technology when a decoder reconstructs high-quality video by receiving the data, is underway in MPEG-I.

However, in the pruning process by which overlapping areas between multiple views are detected and removed, the amount of image data greatly increases with an increase in the number of reference view images, which makes it difficult to process data.

SUMMARY OF THE INVENTION

An object of the disclosed embodiment is to provide a method for efficiently processing image data, the amount of which greatly increases with an increase in the number of reference views, when multiple reference view images are used.

Another object of the disclosed embodiment is to improve the reliability of pruning by using color information as well as depth values in a pruning process for removing overlapping areas between reference views.

An apparatus for removing redundant data between multi-view videos according to an embodiment includes memory in which at least one program is recorded and a processor for executing the program. The program may perform generating a pruning mask of an additional view image by mapping a basic view image to the additional view image, among multi-view images, and revalidating the pruning mask using color information of the basic view image and the additional view image. Revalidating the pruning mask may comprise defining a color relationship between the basic view image and the additional view image by extracting predetermined sample values from corresponding pixels between the basic view image and the additional view image, which are included in a pruning candidate group of the pruning mask, and detecting pixels that do not match the defined color relationship, among pixels in the pruning mask, as outliers.

Here, when defining the color relationship is performed, the program may perform segmenting an area in which the pixels included in the pruning candidate group are present into multiple equal sections, extracting sample values that represent pixels included in each of the multiple equal sections, and calculating a color relationship function using the extracted sample values.

Here, the multiple equal sections may be multiple uniform cubes acquired by evenly segmenting an RGB color space configured with three channels respectively corresponding to red, green, and blue.

Here, when extracting the predetermined sample values is performed, the program may calculate an average value of pixels for each of the multiple equal sections and extract a pixel having a value that is closest to the calculated average value as a sample value.

Here, when extracting the predetermined sample values is performed, the program may assign weights to the respective pixels based on a predetermined threshold before calculating the average value of the pixels.

Here, the color relationship function may be defined using a least-squares method.

Here, when calculating the color relationship function is performed, the program may calculate the color relationship function by applying a reliability, including at least one of the number of pixels extracted from each of the multiple equal sections as the sample values, or a standard deviation of the sample values, or a combination thereof, as a weight.

Here, information about the multiple equal sections acquired by segmenting the area in which the pixels included in the pruning candidate group are present, the sample values that represent the pixels included in the multiple equal sections, the color relationship function calculated using the extracted sample values, and information including a standard deviation and a probability distribution of the sample values may constitute metadata, and the metadata may be transferred to a decoder, thereby being used to restore a value removed by pruning when rendering is performed.

A method for removing redundant data between multi-view videos according to an embodiment includes generating a pruning mask of an additional view image by mapping a basic view image to the additional view image, among multi-view images, and revalidating the pruning mask using color information of the basic view image and the additional view image. Revalidating the pruning mask may include defining a color relationship between the basic view image and the additional view image by extracting predetermined sample values from corresponding pixels between the basic view image and the additional view image, which are included in a pruning candidate group of the pruning mask, and detecting pixels that do not match the defined color relationship, among pixels in the pruning mask, as outliers.

Here, defining the color relationship may include segmenting an area in which the pixels included in the pruning candidate group are present into multiple equal sections, extracting sample values that represent pixels included in each of the multiple equal sections, and calculating a color relationship function using the extracted sample values.

Here, the multiple equal sections may be multiple uniform cubes acquired by evenly segmenting an RGB color space configured with three channels respectively corresponding to red, green, and blue.

Here, extracting the predetermined sample values may comprise calculating an average value of pixels for each of the multiple equal sections and extracting a pixel having a value that is closest to the calculated average value as a sample value.

Here, extracting the predetermined sample values may comprise assigning weights to the respective pixels based on a predetermined threshold before calculating the average value of the pixels.

Here, the color relationship function may be defined using a least-squares method.

Here, calculating the color relationship function may comprise calculating the color relationship function by applying a reliability, including at least one of the number of pixels extracted from each of the multiple equal sections as the sample values, or a standard deviation of the sample values, or a combination thereof, as a weight.

Here, information about the multiple equal sections acquired by segmenting the area in which the pixels included in the pruning candidate group are present, the sample values that represent the pixels included in the multiple equal sections, the color relationship function calculated using the extracted sample values, and information including a standard deviation and a probability distribution of the sample values may constitute metadata, and the metadata may be transferred to a decoder, thereby being used to restore a value removed by pruning when rendering is performed.

An apparatus for removing redundant data between multi-view videos according to an embodiment includes memory in which at least one program is recorded and a processor for executing the program. The program may perform calculating a color difference between a synthesis view at a parent node and a source view assigned to a child node in a pixel-wise manner for pixels determined to be pruned in an initial pruning step, calculating a fitting function for modeling the calculated color difference, and performing update based on the calculated fitting function such that pixels corresponding to outliers are not pruned from a pruning mask. Calculating the fitting function may comprise sampling pixels in an equal section as input pixels for the fitting function.

Here, calculating the fitting function may comprise sampling pixels in cubes acquired by evenly segmenting an RGB color space configured with three channels respectively corresponding to red, green, and blue.

Here, calculating the fitting function may comprise determining a sample value using pixels that are closest to average color distances of all pixels in the cube.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The advantages and features of the present invention and methods of achieving them will be apparent from the following exemplary embodiments to be described in more detail with reference to the accompanying drawings. However, it should be noted that the present invention is not limited to the following exemplary embodiments, and may be impplemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for removing redundant data between multi-view videos according to an embodiment will be described in detail with reference to FIGS. 1 to 8.

Figure 1:
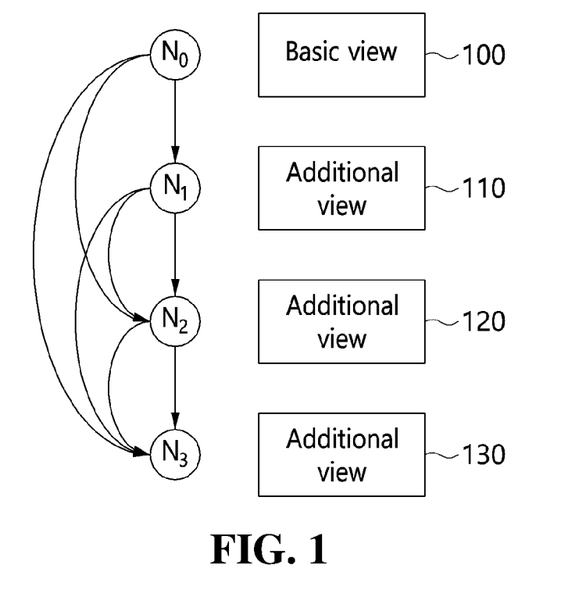
FIG. 1 and FIG. 2 are views for explaining a pruning technique employed for a test model, the standardization of which is underway in the MPEG-I visual group.
Figure 2:
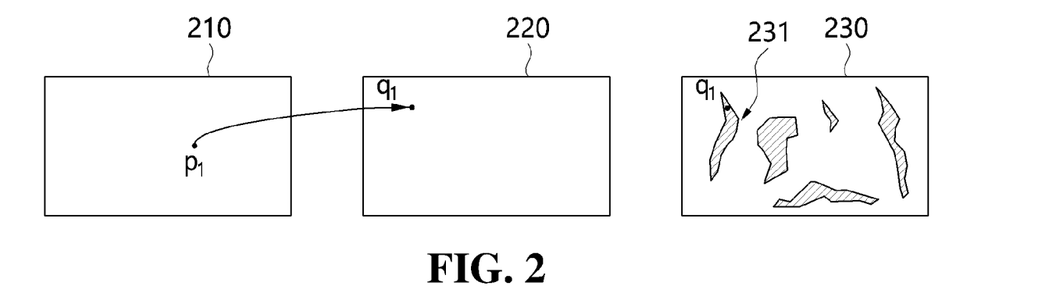

FIG. 1 and FIG. 2 are views for explaining a pruning technique employed for a test model, the standardization of which is underway in the MPEG-I visual group.

FIG. 1 is a pruning graph, and one or more basic view images 100, among multiple view images, are designated as a root node. The remaining images 110, 120, and 130 are additional view images, and are designated as parent nodes and child nodes according to a preset pruning order, thereby forming the pruning graph. The root node is the topmost node, the node above a given node is called the parent node thereof, and nodes beneath a given node are called the child nodes thereof.

In a pruning process, when a pruning graph such as that illustrated in FIG. 1 is generated, all pixels in the basic view image 100 at the root node are projected to the positions of the views at the child nodes connected to the root node in the pruning graph through a 3D view warping process. All of the additional view images 110, 120, and 130 have pruning masks which reflects whether to remove (prune) or preserve pixels overlapping the projected pixels of the view image at the parent node after the pruning process.

Referring to FIG. 2, it can be seen that the first view 210 is assigned higher priority than the second view 220 in a pruning order. Accordingly, a pixel determined to be common to both the first view image 210 and the second view image 220 is preserved in the first view image 210 but is removed from the second view image 220.

In the method of determining such a correspondence relationship, the depth value of a first pixel pi in the first view image 210 is compared with the depth value of a second pixel qi in the second view image 220, to which the first pixel pi is mapped through 3D view warping of the first view 210 to the second view 220 using the depth value of the first pixel $p_1$. When the difference between the depth values of the two pixels is less than a threshold value, the two pixels are determined to have a correspondence relationship. When the two pixels are determined to have a correspondence relationship therebetween, the second pixel qi is set as the pixel to be removed from the second view image 220, and is marked in the pruning mask 230 of the second view 220.

Because the second view 220 is located at a child node of the node at which the first view 210 is located in the pruning graph, the point corresponding to the correspondence between the first view 210 and the second view 220 is removed (pruned) from the second view image 220 through the above-described procedure.

Through the above-described pruning process, information about redundant pixels is lost, and only the remaining pixels are packed into one or more images in the form of patches, encoded through an encoding process, and transferred to a decoder on the receiver side in the form of a stream.

However, the decoder may require pixels in the portion for which the information is removed, in which case the decoder may use information about the first pixel pi, which is the corresponding point in the first view 210 at the parent node of the node at which the second view 220 is located in the pruning graph, by referring to pruning graph information, which is transferred as metadata, when it performs rendering.

However, if only depth values are referred to in order to determine whether two pixels are corresponding points, as described above, when the depth values contain an error, one of the pixels may be removed even if the two pixels are different pixels. When a pixel that is not redundant is removed because it is erroneously determined to be a point that corresponds to another, the decoder acquires no information about the pixel, which causes quality degradation when a view dependent thereon is reconstructed.

Accordingly, revalidation, by which pixels that are erroneously determined to be redundant pixels in the pruning candidate group 231 of the mask image 230 are detected as outliers through postprocessing, is required.

Figure 3:
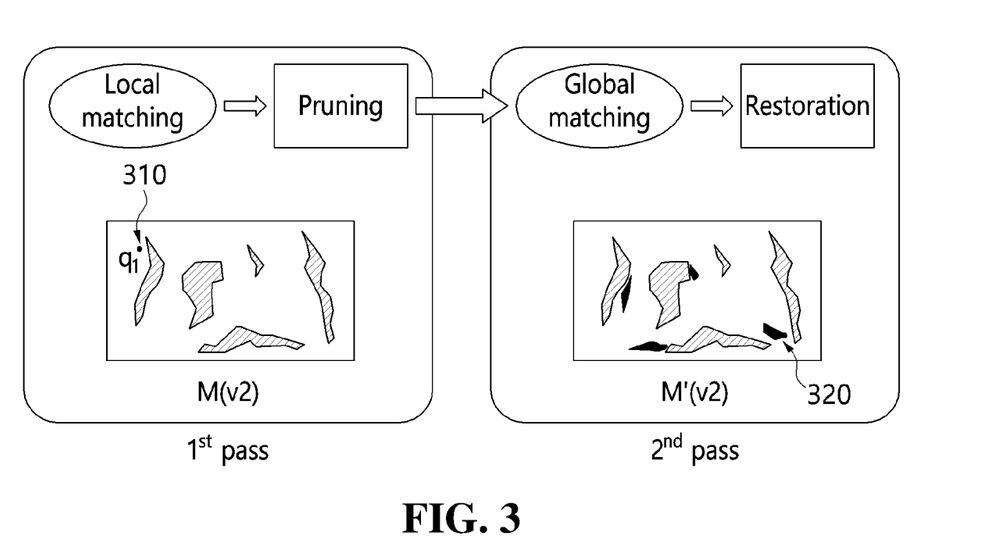
FIG. 3 is a view for explaining a process for revalidating redundant pixels in a pruning process.

FIG. 3 is a view for explaining the process of revalidating redundant pixels in a pruning process.

Referring to FIG. 3, a first pass, in which a redundant pixel 310 is removed (pruned) through local matching using depth values of pixels in order to determine whether two pixels in two view images correspond to the same point, and a second pass, in which an incorrectly pruned pixel 320 is restored through global matching using the overall similarity of pixels between the two images, may be performed in the pruning process.

As described above, when only local depth values or pixel values are referred to in order to determine whether two pixels are corresponding points, as in the first pass, if the local depth values or the pixel values contain an error, one of the two pixels may be removed even though the two pixels are different pixels. In order to prevent this, global matching is performed in the second pass so as to detect outliers by receiving the pixels determined to be redundant pixels from a pruning candidate group and postprocessing the same.

Here, the second pass is performed by receiving the pruning mask image generated in the first pass, and the criteria for determining an outlier in the global matching method are described below.

In FIG. 2, assuming that the first pixel pi and the second pixel qi are actually corresponding points, color components corresponding to the textures of the two points must be identical to each other under ideal conditions because they correspond to the same point in the same scene projected to different view images. However, the intensity of the color components may change due to variation in illumination depending on a view position, the method of acquiring a view image using a camera, image noise, or the like. Therefore, the textures of the two points, which are actually corresponding points, may have similar values within a certain range, rather than being the same as each other.

Accordingly, the dominant color difference between the first view image 210 and the second view image 220, which is caused due to the different environments in which the two respective view images are acquired, may be defined as a specific function f by extracting corresponding points between the first view image 210 and the second view image 220 as samples and using the same. Here, the color relationship between the first view image 210 and the second view image 220 may correspond to the specific function f, as shown in Equation (1) below:

$$q_1 = f(p_1) \tag{1}$$

If the color difference or color compensation relationship between corresponding points in the first view image 210 and the second view image 220 can be defined using the specific function f, a point that does not converge to the function f, among the points in the pruning candidate group 231 of the mask image 230, may be determined to be an outlier, rather than a point corresponding to another.

When an outlier is detected by calculating the global color similarity between the corresponding point candidate groups of the first view image 210 and the second view image 220, as described above, pixels 320 may be restored, rather than being removed, as illustrated in the second pass of FIG. 3.

Meanwhile, the function f may be a linear or nonlinear equation. When the relationship between pixels in the corresponding point candidate group is represented as a linear expression in the form of Ax=b, it may be represented as shown in Equation (2) below:

$$\begin{pmatrix} p_{00} & \cdots & p_{0n} \\ \vdots & \ddots & \vdots \\ p_{m0} & \cdots & p_{mn} \end{pmatrix} \begin{pmatrix} f_{00} & \cdots & f_{0k} \\ \vdots & \ddots & \vdots \\ f_{nk} & \cdots & f_{nk} \end{pmatrix} = \begin{pmatrix} q_{00} & \cdots & q_{0n} \\ \vdots & \ddots & \vdots \\ q_{m0} & \cdots & q_{mn} \end{pmatrix} \quad (2)$$

p denotes the values of the pixels that are mapped by warping the first view image 210 to the second view image 220, and q denotes the values of the original pixels of the second view image 220. f denotes parameters for compensation between the two pixel values.

As described above, all of the pixels included in the pruning candidate group are used in order to estimate the function f. However, when a large number of pixels is included in the pruning candidate group, it takes a long time to represent the relationship as a linear expression and calculate the same due to the large amount of data. Further, the accuracy of estimation of a linear expression may be limited.

Figure 4:
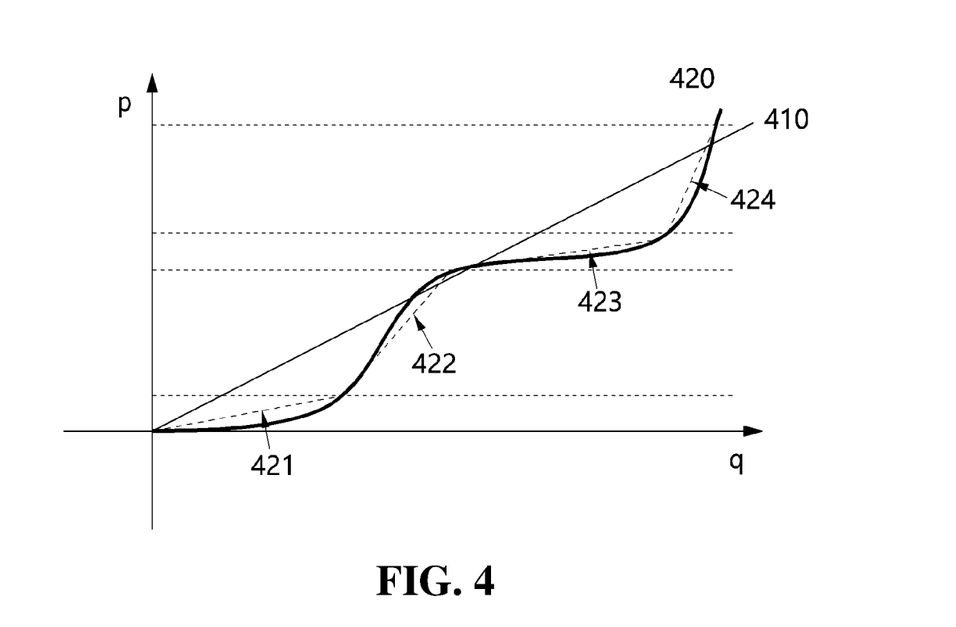
FIG. 4 is a view representing the relationship between corresponding points, included in a pruning candidate group and following the relationship defined by a fitting function, in a 2D coordinate system.

FIG. 4 is a view representing the relationship between corresponding points included in a pruning candidate group that follow the relationship defined by function f in a 2D coordinate system.

Equation (3) below is a function that represents the dominant color difference between the two view images 210 and 220.

$$q = f(p) \quad (3)$$

When the relationship between p, which is a set of points included in the pruning candidate group, and q, which a set of points corresponding thereto, that satisfies the relationship defined by the function f is simply represented in the 2D coordinate system, it may be represented as a linear relationship, like the straight line 410 shown in FIG. 4.

However, if the relationship between p included in the pruning candidate group and q is a nonlinear relationship, like the curve 420, respective sections of the straight line 410, which is estimated based on the assumption that the relationship between p and q is a linear relationship, may be erroneous.

As described above, representing all pixels as a single linear relationship results in limited accuracy, and representing the same as a nonlinear relationship requires high computational complexity. Accordingly, the pruning candidate group is divided into certain sections, and may be represented as multiple linear relationships, like the straight lines 421, 422, 423, and 424 in FIG. 4. This may be represented as the function shown in Equation (4):

$$p = f_1(q_1) \oplus f_2(q_2) \oplus f_3(q_3) \oplus f_4(q_4) \oplus \ldots \oplus f_n(q_n) \quad (4)$$

When the relationship between p and q is represented using multiple linear relationships as shown in Equation (4), the relational expression may be more accurately estimated while the error in each section is reduced.

As described above, when the pruning candidate group is divided into certain sections and when different relational functions are defined for the respective sections, range information pertaining to the multiple sections and the relational functions of the respective sections may be transferred to a decoder as metadata. Accordingly, the decoder may use the information included in the received metadata as a restoration function when an unpruning process is performed or when an arbitrary view image is reconstructed.

Here, the above-mentioned relational function may be in the form of coefficients of a high-order nonlinear function, in the form of a matrix representing a relational expression, or in the form of data for configuring a network trained through a deep-learning process.

Figure 5:
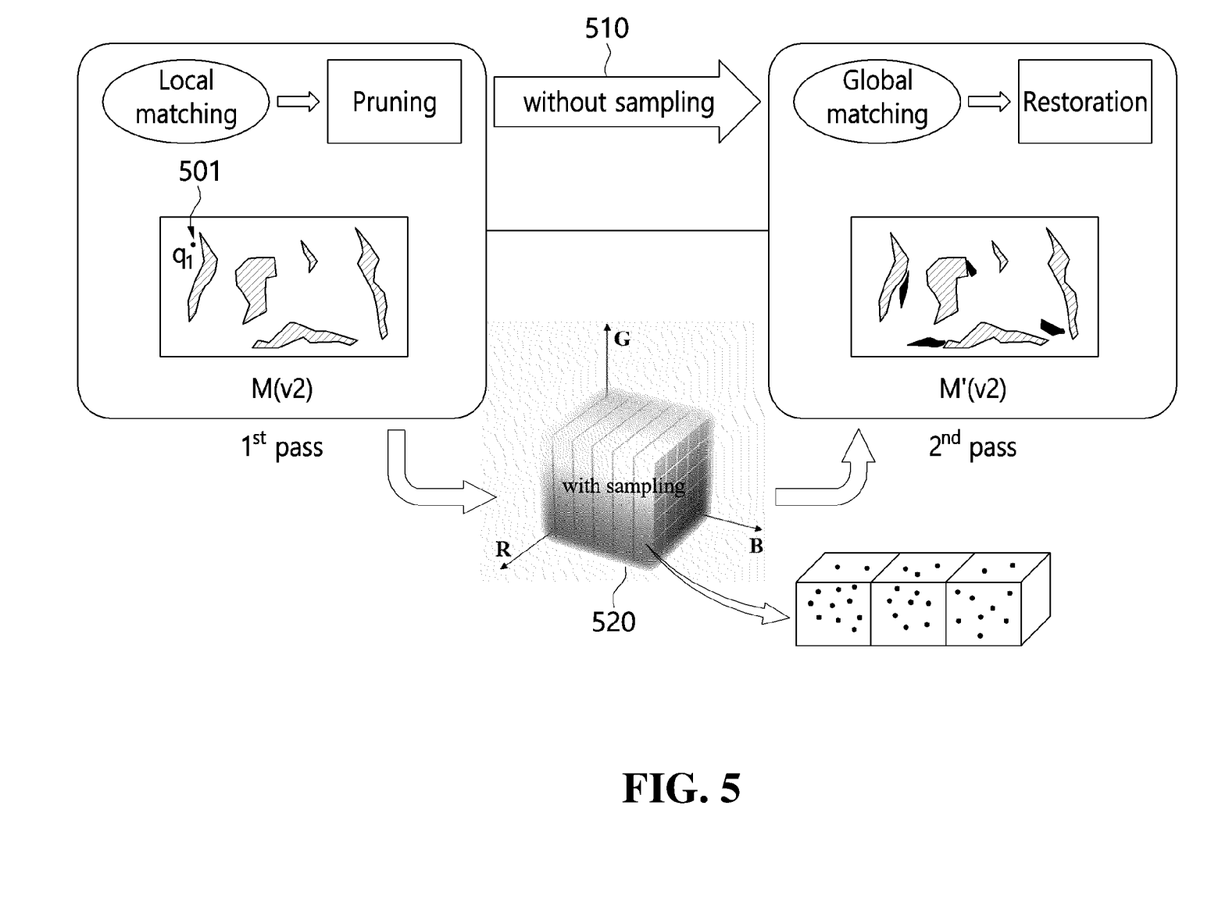
FIG. 5 is an exemplary view of the case in which a pruning candidate group is divided based on three channels respectively corresponding to R, G, and B such that each of the channels is divided into a fixed number of sections according to an embodiment.
Figure 6:
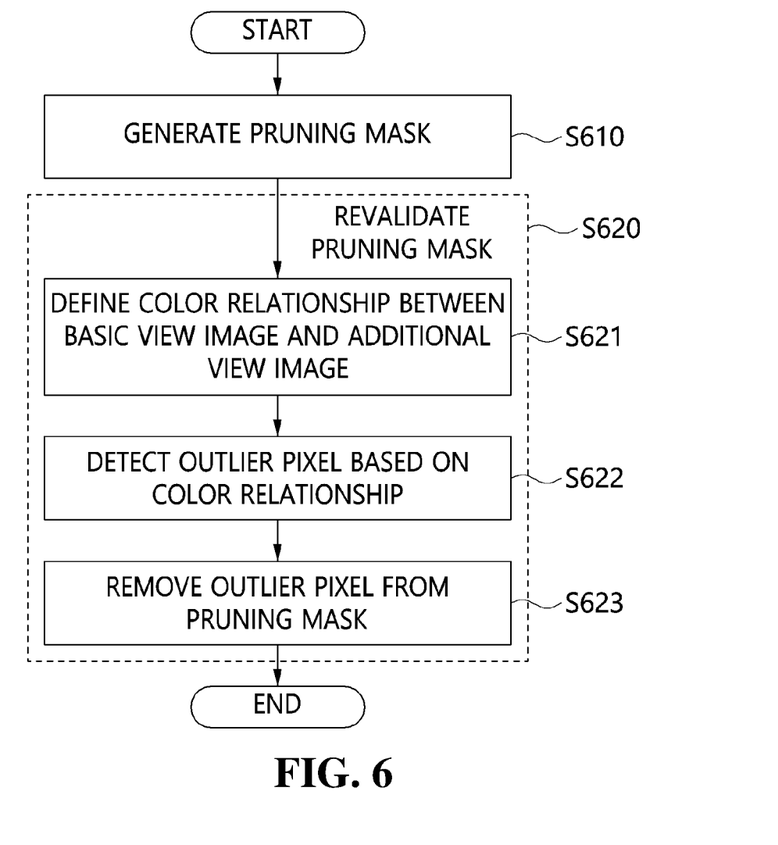
FIG. 6 is a flowchart for explaining a method for removing redundant data between multi-view videos according to an embodiment.
Figure 7:
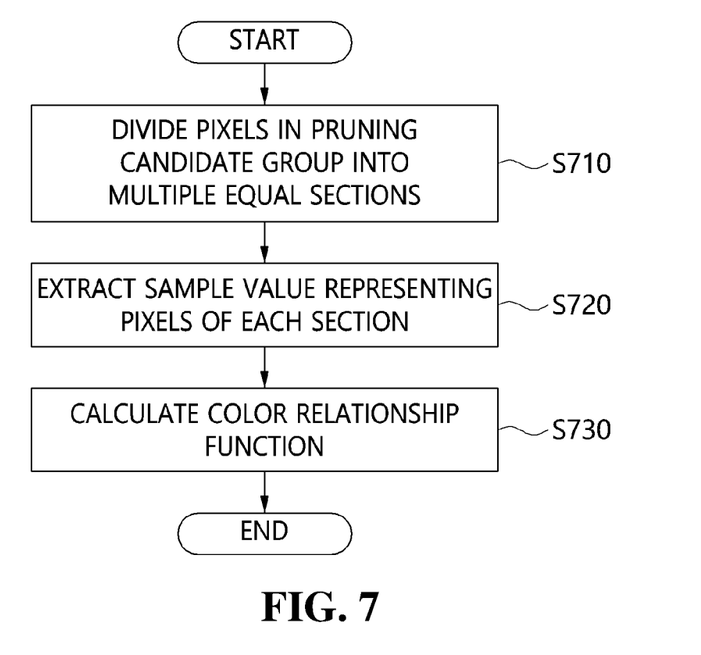
FIG. 7 is a flowchart for explaining a step of defining a color relationship according to an embodiment.

FIG. 5 is an exemplary view of the case in which a pruning candidate group is divided based on three channels, namely R, G, and B, such that each of the channels is divided into a fixed number of channels (N) according to an embodiment, FIG. 6 is a flowchart for explaining a method for removing redundant data between multi-view videos according to an embodiment, and FIG. 7 is a flowchart for explaining the step of defining a color relationship according to an embodiment.

Referring to FIG. 6, the method for removing redundant data between multi-view videos according to an embodiment may include generating a pruning mask of an additional view image at step S610 by mapping a basic view image to the additional view image, among multi-view images, and revalidating the pruning mask using color information of the basic view image and the additional view image at step S620.

Here, generating a pruning mask at step S610 corresponds to local matching in the first pass illustrated in FIG. 5. Also, revalidating the pruning mask at step S620 corresponds to global matching in the second pass illustrated in FIG. 5.

Also, referring to FIG. 6, revalidating the pruning mask at step S620 according to an embodiment may include defining the color relationship between the basic view image and the additional view image at step S621 by extracting predetermined sample values from the corresponding pixels between the basic view image and the additional view image, which are included to the pruning candidate group of the pruning mask, detecting the pixels that do not match the defined color relationship, among the pixels in the pruning mask, as outliers at step S622, and updating the pruning mask by removing the pixels detected as outliers, among the pixels in the pruning mask, at step S623.

In the conventional method, all of the corresponding points in the pruning mask acquired by performing step S610 are used in order to estimate the color relationship at step S620. However, the greater the number of pixels in the pruning mask, the longer the operation time for estimating the color relationship. Also, when the number of outliers that can be regarded as noise, among the pixels in the pruning mask, increases, the accuracy of the color relationship may be degraded.

Accordingly, defining the color relationship at step S621 according to an embodiment may include dividing the area in which pixels included in the pruning candidate group are present into multiple equal sections at step S710, extracting sample values representing the pixels included in the respective sections at step S720, and calculating a color relationship function using the extracted sample values at step S730.

That is, in the embodiment, the color relationship function is defined using only the sample values capable of representing the pixels included in the multiple sections (small groups or small sets), rather than being estimated using all of the pixels included in the pruning candidate group, as in the conventional method. Accordingly, a smaller number of input values is used compared to the conventional method, whereby the computation amount and computation time consumed for estimation of the relational function may be significantly reduced.

Here, the multiple equal sections may be multiple uniform cubes into which an RGB color space formed of red, green, and blue channels is evenly segmented.

That is, referring to FIG. 5, the case in which the pruning candidate group is divided based on R, G, and B channels such that each of the channels is segmented into a fixed number (N) of sections is illustrated. For example, when each of the R, G, and B channels is segmented into N sections, small groups in the form of N×N×N cubes may be generated in the 3D RGB color space. Then, sample values representing the small groups may be sampled. Accordingly, complexity may be reduced when the color relationship function is calculated.

However, the present invention is not limited to evenly segmenting the 3D RGB space. That is, according to the present invention, small groups may be formed by evenly segmenting an image using the coordinates thereof in a 2D or 3D image domain, after which respective representative values of the small groups may be estimated. In this case, the spatial locality of the corresponding points in the pruning candidate group is considered, whereby a color relationship function may be estimated more accurately.

Also, according to an embodiment, the color space that is used is not limited to the RGB color model, and any of various color models, such as YUV, Lab, or the like, may be used.

Meanwhile, extracting the predetermined sample values at step S720 according to an embodiment may comprise calculating the average value of the pixels for each of the multiple equal sections and extracting the pixel having a value closest to the calculated average value as the sample value.

Here, when the average value is calculated, a weight may be assigned to each pixel based on a predetermined threshold before the average value of the pixels is calculated. That is, in order to prevent outliers from distorting the average value, outliers falling out of a predetermined range based on the predetermined threshold are assigned a low weight, or are excluded when the average is calculated, but pixels corresponding to inliers may be assigned a high weight. Accordingly, the pixel values estimated to be outliers are excluded when the sample values are extracted, whereby error may be reduced and accuracy may be improved.

Here, the color relationship function may be defined using a least-squares method. Also, the color relationship function may be a fitting function for optimally modeling the color difference calculated between a synthesis view at the parent node and a source view assigned to the child node in a pixel-wise manner for the pixels determined to be pruned in the initial pruning step.

Here, calculating the color relationship function at step S730 may comprise calculating the color relationship function by applying reliability, including at least one of the number of pixels extracted from each of the multiple sections as sample values, or the standard deviation of the sample values, or a combination thereof, as a weight. Accordingly, the color relationship function may be estimated more accurately.

Also, according to another embodiment, calculating the color relationship function at step S730 may comprise dividing the pruning candidate group into certain sections, representing the sections with multiple linear relationships appearing as the straight lines 421, 422, 423, and 424 in FIG. 4, and calculating the color relationship function as is shown in Equation (4).

Referring again to FIG. 6, whether the pixels in the pruning candidate group, which are included in the pruning mask generated at step S610, are redundant is revalidated based on the color relationship defined at step S621.

That is, the point that does not converge to the function f, among the points in the pruning candidate group, is determined to be an outlier, rather than a point corresponding to another, at step S622, and is removed from the pruning candidate group at step S623. That is, the pruning mask is updated based on the calculated function f such that the pixels determined to be outliers are not pruned. Conversely, the point converging to the function f, among the points in the pruning candidate group, is determined to be an inlier, that is, a point corresponding to another, at step S622, thereby being preserved in the pruning candidate group.

Meanwhile, according to an embodiment, information about the multiple equal sections acquired by segmenting the area in which the pixels included in the pruning candidate group are present, the sample value for representing the pixels included in each of the multiple equal sections, the color relationship function calculated using the extracted sample values, and information including the standard deviation and the probability distribution of the sample values may constitute metadata.

This metadata is transferred to a receiver, and when rendering is performed, the metadata may be used to reconstruct values that are removed by pruning.

Figure 8:
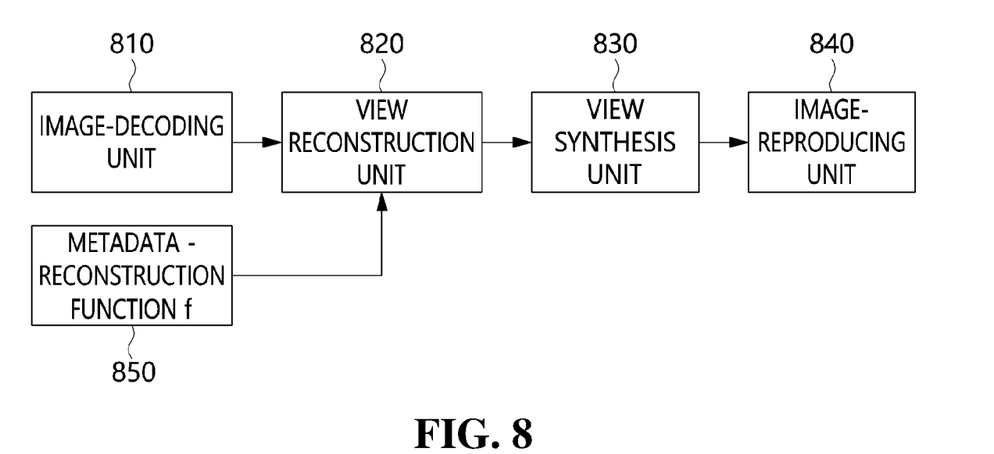
FIG. 8 is a block diagram illustrating a receiver of a test model for immersive video (TMIV)

FIG. 8 is a block diagram illustrating the receiver of TMIV.

The image-decoding unit 810 of the receiver decodes a received atlas, and a view reconstruction unit 820 reconstructs a pruned view, which existed before packing, based on the patches included in the decoded atlas by referring to camera calibration information, patch packing information, and the like included in the metadata 850 received along with the atlas.

A view synthesis unit 830 synthesizes a target view image through an unpruning process when an image is reconstructed so as to appear as an original view image by filling an empty area in the pruned view or when a virtual view image is generated from an arbitrary position in a scene. An image-reproducing unit 840 displays the synthesized image through a display.

The unpruning process is the process of restoring target pixel information by referring to the color and depth values of corresponding points in a view at a parent node through a backward warping method or the like in order to replace the pixels of the view at a child node, which are removed through comparison with the view at the parent node.

Here, in order to mitigate quality degradation when reconstruction is performed, metadata 850 for reconstructing a view is referred to and used by the view synthesis unit 820.

That is, the view synthesis unit 820 utilizes a reconstruction function found by taking the inverse function of the color relationship function included in the metadata, thereby reducing errors that are caused by pruning.

Here, the metadata may include information about the multiple equal sections acquired by segmenting the area in which the pixels included in the pruning candidate group are present, the sample value for representing the pixels included in each of the multiple equal sections, the color relationship function calculated using the extracted sample values, and information including the standard deviation and the probability distribution of the sample values.

Figure 9:
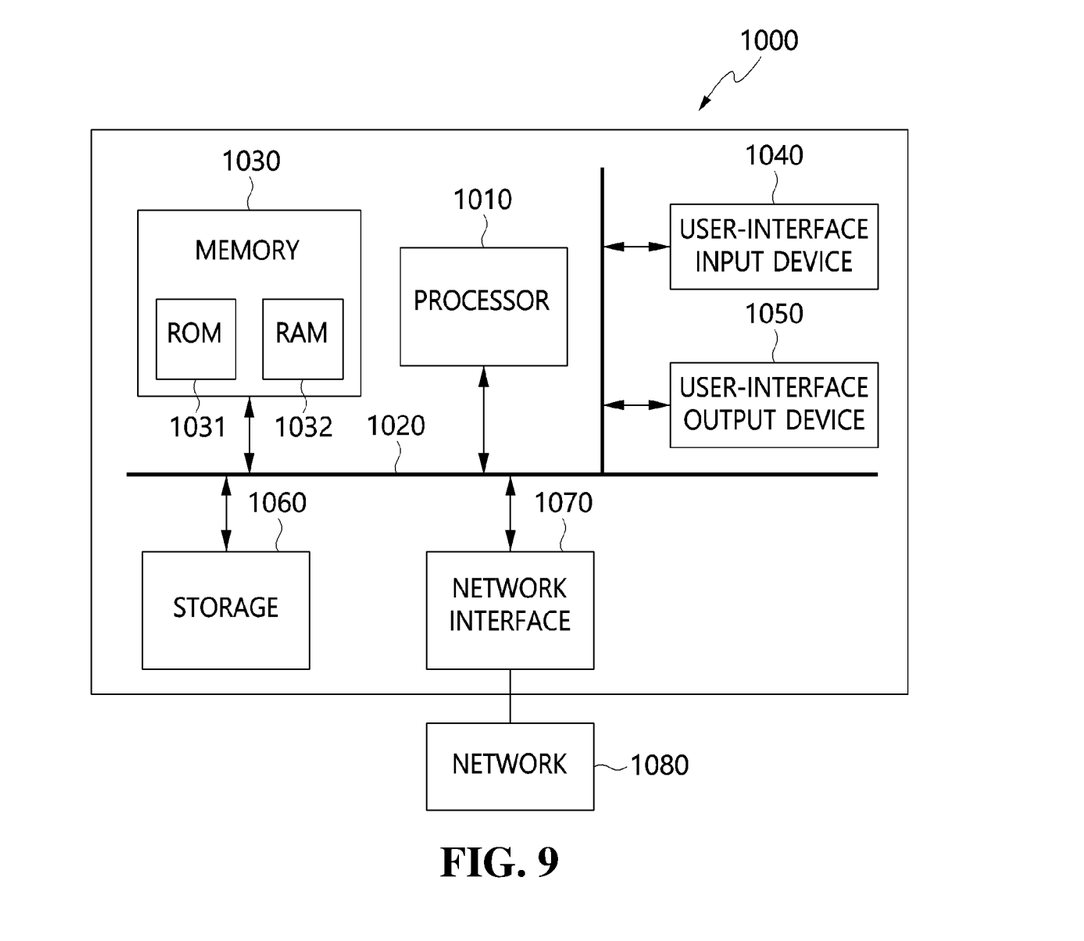
FIG. 9 is a view illustrating a computer system configuration according to an embodiment.

FIG. 9 is a view illustrating a computer system configuration according to an embodiment.

The apparatus for removing redundant data between multi-view videos according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to the disclosed embodiment, when multiple reference view images are used, a method for efficiently processing image data, the amount of which greatly increases with an increase in the number of reference views, may be provided.

According to the disclosed embodiment, the reliability of pruning may be improved using color information as well as depth values in a pruning process for removing overlapping areas between reference views.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for removing redundant data between multi-view videos, comprising:
   memory in which at least one program is recorded; and
   a processor for executing the program,
   wherein:
   the program performs
   generating a pruning mask of an additional view image by mapping a basic view image to the additional view image, among multi-view images, and
   revalidating the pruning mask using color information of the basic view image and the additional view image, and
   revalidating the pruning mask comprises
   defining a color relationship between the basic view image and the additional view image by extracting predetermined sample values from corresponding pixels between the basic view image and the additional view image, which are included in a pruning candidate group of the pruning mask, and
   detecting pixels that do not match the defined color relationship, among pixels in the pruning mask, as outliers,
   wherein, when defining the color relationship is performed, the program performs
   segmenting an area in which the pixels included in the pruning candidate group are present into multiple equal sections,
   extracting sample values that represent pixels included in each of the multiple equal sections, and
   calculating a color relationship function using the extracted sample values.

2. The apparatus of claim 1, wherein the multiple equal sections are multiple uniform cubes acquired by evenly segmenting an RGB color space configured with three channels respectively corresponding to red, green, and blue.

3. The apparatus of claim 1, wherein, when extracting the predetermined sample values is performed, the program calculates an average value of pixels for each of the multiple equal sections and extracts a pixel having a value that is closest to the calculated average value as a sample value.

4. The apparatus of claim 3, wherein, when extracting the predetermined sample values is performed, the program assigns weights to the respective pixels based on a predetermined threshold before calculating the average value of the pixels.

5. The apparatus of claim 1, wherein the color relationship function is defined using a least-squares method.

6. The apparatus of claim 3, wherein, when calculating the color relationship function is performed, the program calculates the color relationship function by applying a reliability, including at least one of a number of pixels extracted from each of the multiple equal sections as the sample values, or a standard deviation of the sample values, or a combination thereof, as a weight.

7. The apparatus of claim 6, wherein:
   information about the multiple equal sections acquired by segmenting the area in which the pixels included in the pruning candidate group are present, the sample values that represent the pixels included in the multiple equal sections, the color relationship function calculated using the extracted sample values, and information including a standard deviation and a probability distribution of the sample values constitute metadata, and
   the metadata is transferred to a decoder, thereby being used to restore a value removed by pruning when rendering is performed.

8. A method for removing redundant data between multi-view videos, comprising:
   generating a pruning mask of an additional view image by mapping a basic view image to the additional view image, among multi-view images; and
   revalidating the pruning mask using color information of the basic view image and the additional view image,
   wherein revalidating the pruning mask includes
   defining a color relationship between the basic view image and the additional view image by extracting predetermined sample values from corresponding pixels between the basic view image and the additional view image, which are included in a pruning candidate group of the pruning mask, and
   detecting pixels that do not match the defined color relationship, among pixels in the pruning mask, as outliers,
   wherein defining the color relationship includes
   segmenting an area in which the pixels included in the pruning candidate group are present into multiple equal sections,
   extracting sample values that represent pixels included in each of the multiple equal sections, and
   calculating a color relationship function using the extracted sample values.

9. The method of claim 8, wherein the multiple equal sections are multiple uniform cubes acquired by evenly segmenting an RGB color space configured with three channels respectively corresponding to red, green, and blue.

10. The method of claim 8, wherein extracting the predetermined sample values comprises calculating an average value of pixels for each of the multiple equal sections and extracting a pixel having a value that is closest to the calculated average value as a sample value.

11. The method of claim 10, wherein extracting the predetermined sample values comprises assigning weights to the respective pixels based on a predetermined threshold before calculating the average value of the pixels.

12. The method of claim 8, wherein the color relationship function is defined using a least-squares method.

13. The method of claim 10, wherein calculating the color relationship function comprises calculating the color relationship function by applying a reliability, including at least one of a number of pixels extracted from each of the multiple equal sections as the sample values, or a standard deviation of the sample values, or a combination thereof, as a weight.

14. The method of claim 13, wherein:
information about the multiple equal sections acquired by segmenting the area in which the pixels included in the pruning candidate group are present, the sample values that represent the pixels included in the multiple equal sections, the color relationship function calculated using the extracted sample values, and information including a standard deviation and a probability distribution of the sample values constitute metadata, and
the metadata is transferred to a decoder, thereby being used to restore a value removed by pruning when rendering is performed.

\* \* \* \* \*